No. 810,417. PATENTED JAN. 23, 1906.
D. KADEL.
MIXER AND KNEADER.
APPLICATION FILED AUG. 7, 1905.
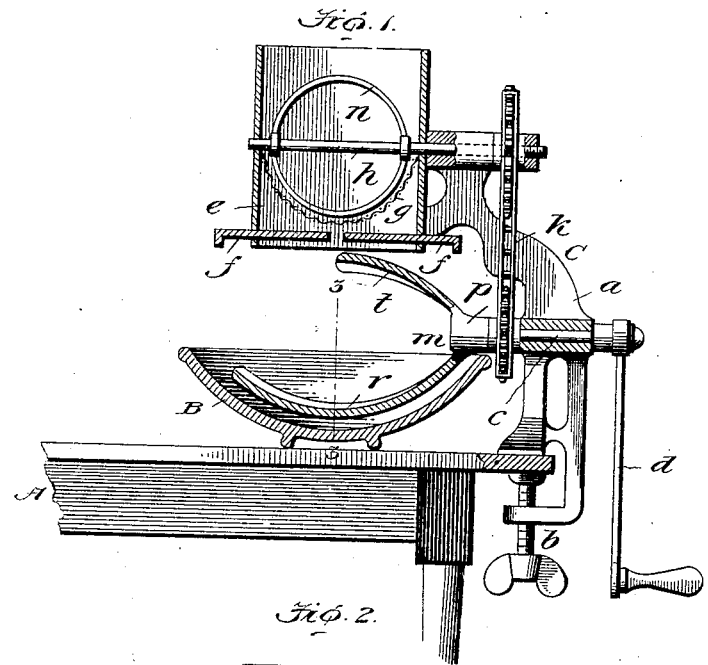
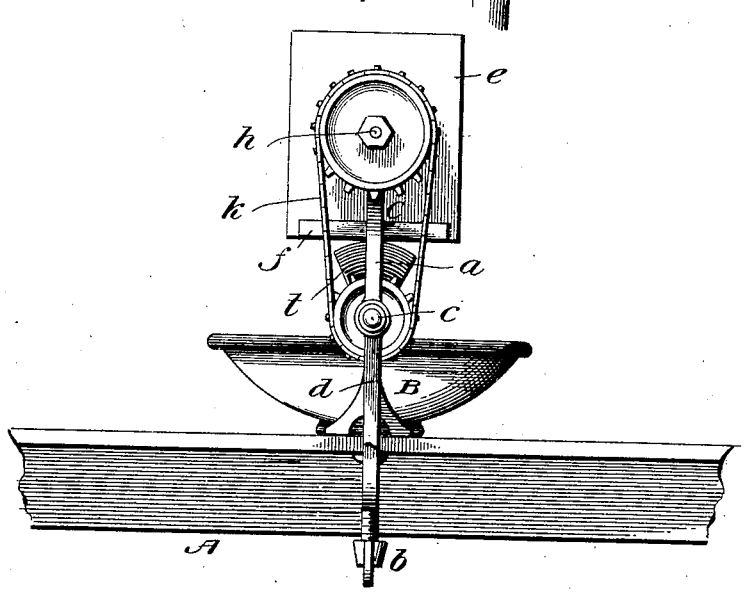
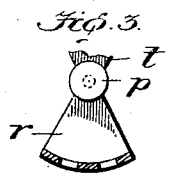
Witnesses
Inventor
Dottie Kadel.
By James J Sheehy
Attorney

UNITED STATES PATENT OFFICE.

DOTTIE KADEL, OF POWDER SPRINGS, GEORGIA.

MIXER AND KNEADER.

No. 810,417.  Specification of Letters Patent.  Patented Jan. 23, 1906.

Application filed August 7, 1905. Serial No. 273,064.

*To all whom it may concern:*

Be it known that I, DOTTIE KADEL, a citizen of the United States, residing at Powder Springs, in the county of Cobb and State of Georgia, have invented new and useful Improvements in Mixers and Kneaders, of which the following is a specification.

My invention pertains to mixers and kneaders, and it contemplates the provision of a simple, easily operated, and efficient device for facilitating the making of cake and the like—*i. e.*, sifting the flour and similar ingredients and mixing or working the batter to the requisite state.

The novelty, utility, and practical advantages of the invention will be fully understood from the following description and claims, when taken in connection with the accompanying drawings, forming part of this specification, in which—

Figure 1 is a view, partly in vertical section and partly in elevation, illustrating my novel device in proper operating position relative to a table and a bowl for holding batter. Fig. 2 is an elevation taken at right angles to Fig. 1, and Fig. 3 is a transverse section taken in the plane indicated by the line 3 3 of Fig. 1 and illustrating the longer arm of the batter mixer and kneader.

Similar letters designate corresponding parts in all of the views of the drawings, referring to which—

A is a table of the ordinary or any other suitable construction. B is a bowl placed on the table and having for its purpose to hold the batter for cakes and the like, and C is my novel device as a whole.

In the present and preferred embodiment of my invention the device C is made up of a frame $a$, of cast-iron or other material compatible with my invention, provided with a clamp $b$, whereby it may be fixed in an upright position on the table after the manner illustrated in Fig. 1; a horizontal shaft $c$, journaled in the frame $a$ and equipped with a crank $d$; a casing $e$, preferably of rectangular form in horizontal section, fixed to and carried by the upper portion of the frame $a$ and open at its upper and lower ends; horizontally-disposed slidable and imperforate doors $f$ for controlling the discharge of flour and the like from the lower portion of the casing $e$; a concavo-convex sieve $g$ of reticulated or other suitable material fixed in the casing $e$; a shaft $h$, journaled in the frame $a$ and arranged about the proportional distance illustrated above the shaft $c$; a driving connection $k$ of sprocket or other suitable gearing intermediate the shafts $c$ and $h$ so as to rotate the latter by the former; a batter mixer and kneader $m$, fixed on and rotatable with the shaft $c$, and an agitator $n$, preferably composed of semicircular arms, fixed on and rotatable with the shaft $h$ and movable in close proximity to the screen or sieve $g$ so as to accelerate the passage of flour therethrough. The mixer and kneader $m$ comprises a head $p$, fixed to or formed integral with the horizontal shaft $c$, a long arm $r$, curved outwardly in the direction of its length and also in the direction of its width, Figs. 1 and 3, and movable around a horizontal center, and a comparatively short arm $t$, arranged diametrically opposite the arm $r$ and curved outwardly in the direction of its length and also in the direction of its width, Figs. 1 and 2, and movable around the said horizontal center. Both arms $r$ and $t$ are fixed with respect to the head $p$, and the arm $t$ is preferably about one-half as long as the arm $r$. In virtue of this when the mixer and kneader is rotated there is no liability of the batter after it becomes stiff being carried around in a continuous circle. On the other hand, it will be noticed that because of the employment of the long and short arms the batter when it reaches the uppermost point will fall from the upper arm to the lower arm and will then be taken up by the latter arm, and when the same reaches the uppermost point the batter will fall to the arm which is then lowermost.

In the practical operation of the device it will be observed that flour and similar ingredients will be sifted in the casing $e$ and will be fed therefrom to the batter, which is mixed and kneaded in the bowl B through the medium of the mixer and kneader $m$. It will also be observed that through the medium of the slidable doors $f$ the operator may regulate the discharge of flour and the like from the casing $e$, or, in other words, may increase or diminish the discharge-opening of said casing; also, that because of both of the doors $f$ being adjustable the flour may be discharged from the center of the casing $e$ or from points at either side of the vertical median line of said casing, as the condition of the batter in the bowl B necessitates.

It will be gathered from the foregoing that notwithstanding the efficiency of my novel device in the making of cake and the like the said device is simple and inexpensive in construction and is adapted to be operated with but little effort; also, that access may be readily gained to all parts of the device, so as to permit of the same being quickly and thoroughly cleaned subsequent to use of the device.

Having described my invention, what I claim, and desire to secure by Letters Patent, is—

1. A device for the purpose set forth, comprising a frame, lower and upper shafts journaled in the frame; said shafts being connected by gearing and one of the same being provided with means whereby it may be turned, a mixer and kneader carried by the lower shaft, a casing fixed to the frame in position to receive the upper shaft and containing a sieve, an agitator fixed to the upper shaft and arranged in the casing above the sieve, and horizontal imperforate doors guided in opposite walls of the casing, below the sieve, and slidable toward and from each other and also toward and from the vertical center of the casing.

2. In a device for the purpose set forth, the combination of a frame, a horizontal shaft journaled therein, and a mixer and kneader comprising an arm fixed to the shaft and curved outwardly in the direction of its length and movable around a horizontal center, and an arm approximately half as long as the first-mentioned arm, fixed to the shaft diametrically opposite the first-mentioned arm and curved outwardly in the direction of its length and movable around the said horizontal center.

In testimony whereof I have hereunto set my hand in presence of two subscribing witnesses.

DOTTIE KADEL.

Witnesses:
W. M. LANHAM,
JOSIE CRABB.